United States Patent

Sugawara et al.

[11] Patent Number: 5,443,583
[45] Date of Patent: Aug. 22, 1995

[54] METHOD FOR JUDGING FRICTION COEFFICIENT OF ROAD SURFACE AND METHOD FOR ANTI-SKID BRAKE CONTROL USING SAID METHOD

[75] Inventors: Ryuta Sugawara; Satoshi Akimoto, both of Higashimatsuyama, Japan

[73] Assignee: Jidosha Kiki Co., Ltd., Tokyo, Japan

[21] Appl. No.: 883,376

[22] Filed: May 15, 1992

[30] Foreign Application Priority Data

May 23, 1991 [JP] Japan .................................. 3-118761

[51] Int. Cl.⁶ .............................................. B60T 8/58
[52] U.S. Cl. .................................. 303/169; 303/139; 303/113.1
[58] Field of Search ................. 303/93, 94, 95, 96, 303/100, 103, 109, 110, 111, 113.1, 9.62, 113.5, 107; 364/426.01, 426.02, 426.03

[56] References Cited

U.S. PATENT DOCUMENTS

| | | | |
|---|---|---|---|
| 3,545,817 | 12/1970 | Yarber | 303/93 |
| 3,893,330 | 7/1975 | Shute et al. | 303/100 X |
| 4,033,634 | 7/1977 | Arai et al. | 303/103 |
| 4,779,447 | 10/1988 | Rath | 303/100 X |
| 5,092,662 | 3/1992 | Okubo | 303/96 X |
| 5,123,715 | 6/1992 | Okubo | 303/103 X |

FOREIGN PATENT DOCUMENTS

| | | | |
|---|---|---|---|
| 0039946 | 4/1981 | Japan | 303/100 |
| 0247961 | 10/1987 | Japan | 303/100 |
| 0038072 | 2/1988 | Japan | 303/100 |
| 0207762 | 8/1988 | Japan | 303/110 |
| 403258650 | 11/1991 | Japan | 303/100 |
| 2169675 | 7/1986 | United Kingdom | 303/111 |

Primary Examiner—Robert J. Oberleitner
Assistant Examiner—Peter M. Poon
Attorney, Agent, or Firm—Varndell Legal Group

[57] ABSTRACT the present invention, a counter value is increased by a predetermined increment when it is judged that front wheel speed is being decelerated and speed difference between front and rear wheels is higher than a setting value, and the counter value is decreased by a predetermined decrement when it is judged that speed difference between front and rear wheels is not higher than the setting value. Next, if it is judged that the counter value is higher than the setting value, a high $\mu$ flag is set. If it is judged that the counter value is not higher than the setting value, the high $\mu$ flag is cleared. Thus, it is judged whether road surface has a high $\mu$ value or not by speed difference between front and rear wheels and by duration, during which the speed difference is maintained. When a high $\mu$ flag is set, a control value for high $\mu$ value is set as a control value relating to anti-skid brake control, and if the high $\mu$ flag is cleared, a control value for low $\mu$ value is set.

6 Claims, 2 Drawing Sheets

Behavior of wheel speed at high μ value

Behavior of wheel speed at low μ value

METHOD FOR JUDGING FRICTION COEFFICIENT OF ROAD SURFACE AND METHOD FOR ANTI-SKID BRAKE CONTROL USING SAID METHOD

BACKGROUND OF THE INVENTION

The present invention relates to a method for anti-skid brake control for performing anti-skid brake control based on a friction coefficient $\mu$ (herein) after simply referred as "$\mu$") during braking, judged on road surface, and in particular to a method for judging a friction coefficient of a road surface through behavior of wheel speeds during braking and also to a method for adequately performing anti-skid brake control based on the $\mu$ value, which has been judged by the above judging method.

Anti-skid brake control is generally performed as follows: When it is detected that the wheels are in a skid condition during braking, the braking force on the wheels is decreased to eliminate the skid condition. By increasing the braking force again thereafter, the steering of the vehicle is stabilized and the braking distance is made as short as possible.

In this anti-skid brake control, a control value of brake fluid pressure varies according to the $\mu$ value of the road surface where the vehicle is running and behavior of the wheel speeds against the change of the fluid pressure changes. Thus, it is necessary to perform anti-skid brake control giving full consideration on the value of $\mu$ of road surface.

Anti-skid brake control has been performed to match either a road with low $\mu$ value or a road with high $\mu$ value, or it has been performed commonly for both of a road with low $\mu$ value and a road with high $\mu$ value.

However, in such conventional anti-skid brake control, anti-skid brake control is performed commonly for both low a $\mu$ value and high $\mu$ value. Thus, the anti-skid brake control is not always adequately performed for the road with a low $\mu$ value and the road with a high $\mu$ value, and the control is not compatible with both of a low $\mu$ road and a high $\mu$ road.

SUMMARY OF THE INVENTION

It is an object of the present invention to provide a method for judging a friction coefficient of road surface, by which it is possible to perfectly find a $\mu$ value of road surface before anti-skid brake control is started.

It is another object of the invention to provide a method for anti-skid brake control, by which it is possible to perform anti-skid brake control with a control pattern to match the $\mu$ value when the $\mu$ has been judged by the above judging method.

To attain these objects, the method for judging a friction coefficient of road surface according to the present invention is characterized in that the front wheels are in decelerating state during braking and the friction coefficient of road surface is judged by a speed difference between the front and rear wheels and by duration, during which the speed difference is maintained.

The present invention is also characterized in that a friction coefficient of road surface is judged independently for the left and right and front and rear wheels.

Further, the present invention is characterized in that a counter value with a preset initial value is increased by a predetermined increment when a speed difference between the front and rear wheels is higher than a first setting value, and the counter value with a preset initial value is decreased by a predetermined decrement when the speed difference between the front and rear wheels is lower than the first setting value, whereby road surface is judged to have a high friction coefficient when the resultant counter value is higher than a second setting value, and road surface is judged to have a low friction coefficient when the counter value is lower than the second setting value.

Further, the present invention is characterized in that a counter value with a preset initial value is decreased by a predetermined decrement when the speed difference between the front and rear wheels is higher than a first setting value, and the counter value with a preset initial value is increased by a predetermined decrement when the speed difference between the front and rear wheels is lower than the first setting value, whereby road surface is judged to have a low friction coefficient when the resultant counter value is higher than a second setting value, and road surface is judged to have a high friction coefficient when the counter value is lower than the second setting value.

In the method for judging a friction coefficient of road surface according to the present invention with such arrangement, the speed difference between front and rear wheels is detected when it is judged that the front wheels are being decelerated by braking. The friction coefficient of the road surface is judged by the detected speed difference and by duration, during which the speed difference is maintained. Thus, the friction coefficient $\mu$ of the road surface can be judged before anti-skid brake control is started.

Also, according to the present invention, a friction coefficient of road surface can be judged independently for each of left and right and front and rear wheels. Also, it is possible to judge whether the friction coefficient $\mu$ of the road surface is high or low.

In this way, it is possible according to the method for judging a friction coefficient of road surface of this invention to easily and reliably judge the $\mu$ value of road surface before anti-skid brake control is started.

On the other hand, the method for anti-skid brake control according to the present invention is characterized in that a control value relating to anti-skid brake control such as a threshold for a pressure reduction mode or a pressure increase mode based on a friction coefficient of road surface, which has been judged by the method for judging the friction coefficient of road surface as described above, and anti-skid brake control is performed according to the control value.

In the anti-skid brake control method of the present invention as described above, a friction coefficient of road surface is judged before the anti-skid brake control is started, and the anti-skid brake control is performed according to the friction coefficient. Accordingly, it is possible to more adequately carry out the anti-skid brake control in relation to the friction coefficient of the road surface.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1(a) illustrates the behavior of wheel speed at a high $\mu$ value, and FIG. 1(b) shows the behavior of wheel speed at a low $\mu$ value.

DESCRIPTION OF THE PREFERRED EMBODIMENT

Figure 1A:
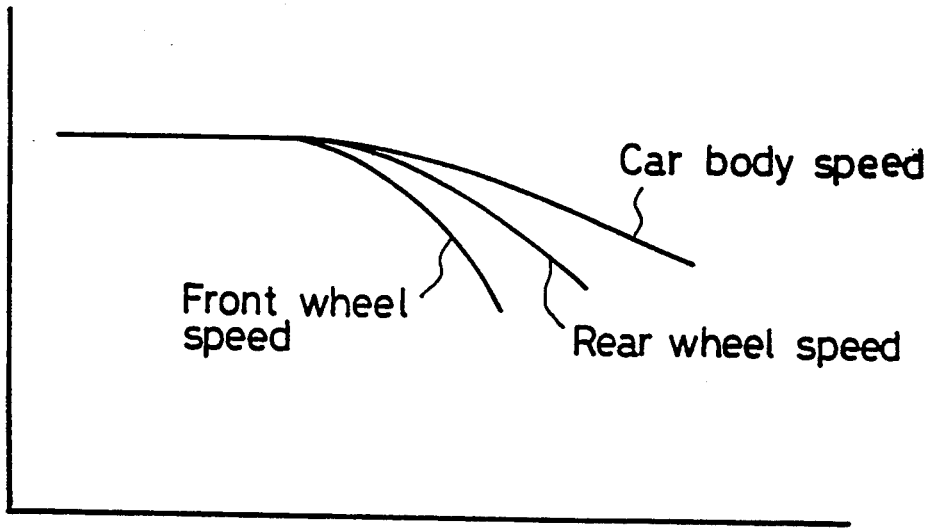
FIG. 1(a) and 1(b) show behavior of wheel speed used for the method to judge a friction coefficient of road surface according to the present invention, where

In the following, description will be given on an embodiment of the present invention, referring to the drawings.

Figure 1B:
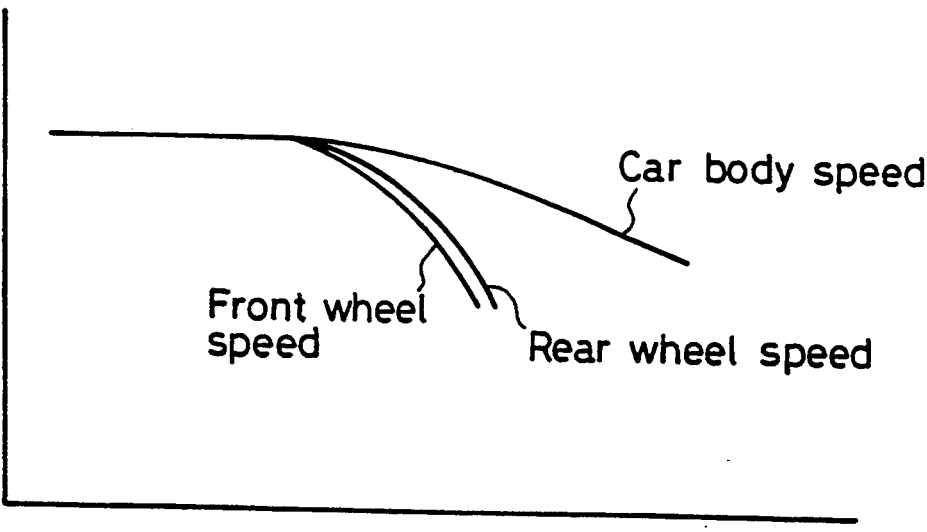

As shown in FIG. 1 (a), when the brake is used during the running of a vehicle along a high $\mu$ road, both front and rear wheel speeds are turned to the state of deceleration. In this case, the front wheel speed is extensively decreased compared with the speed of car body, while the rear wheel speed is not so drastically decreased as the front wheel speed, but it is reduced to somewhere between the car body speed and the front wheel speed. The reason for this is as follows: Because rear wheels are more easily locked than the front wheels due to forward shifting of load during braking, brake fluid pressure is set to such value that the rear wheels are not locked before the front wheels are locked by making the brake fluid pressure rising gradient of the rear wheels more gentle than that of the front wheels. Accordingly, friction the between road surface and wheels is high on a road with a high $\mu$ value, and there arises a large difference between the decrease of the front wheel speed and that of the rear wheel speed.

As shown in FIG. 1 (b), in the case where the brake is used when the vehicle is running on a road with a low $\mu$ value and both the front and rear wheel speeds are turned to a deceleration state, the front and the rear wheel speeds decrease at almost the same timing because the friction between the road surface and the wheels is low on a road with a low $\mu$ value. As the result, there is no substantial difference between the decrease of the front wheel speed and that of the rear wheel speed on the road with low $\mu$ value.

In this way, the speed decrease of the front wheel speed and the rear wheel speed in deceleration state differs between a road with high $\mu$ value and a road with low $\mu$ value. By utilizing this phenomenon, it is possible to judge (or determine) whether the road has a high $\mu$ value or with a low $\mu$ value.

Figure 2:
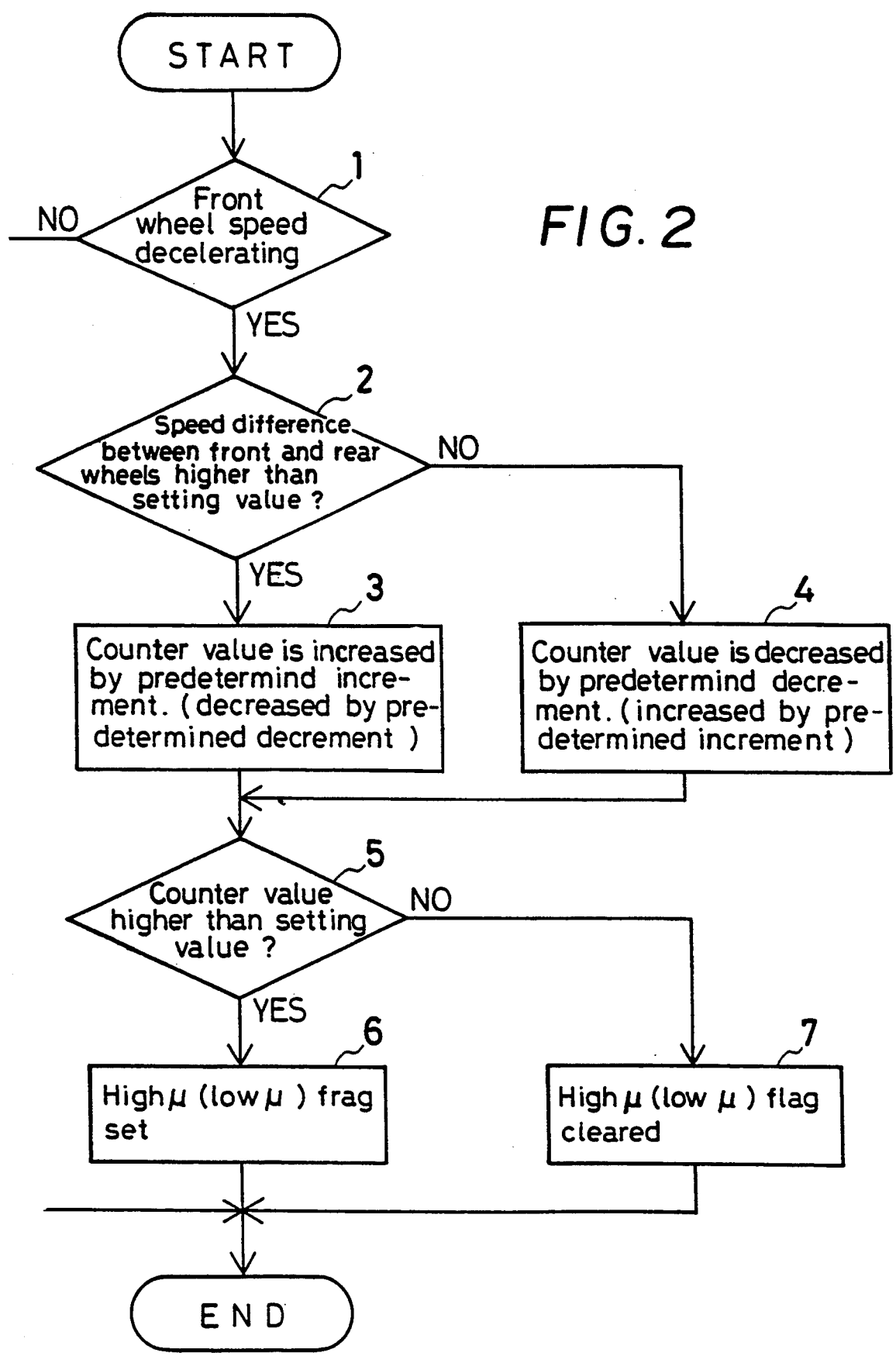
FIG. 2 is a flow chart for judging $\mu$ value of road surface by the behavior of front wheel speed and rear wheel speed before anti-skid brake control is started.

FIG. 2 is a flow chart to judge a friction coefficient of the road surface based on the judgment of high $\mu$ value of road surface by utilizing the phenomenon that the decrease of the front wheel speed and the rear wheel speed is different between a road with a high $\mu$ value and a road with a low $\mu$ value.

As shown in FIG. 2, when brake is used in a running vehicle in the Step 1, it is judged first whether the front wheel speed is turned to deceleration or not. If it is judged that the front wheel speed is not being decelerated, the judging process for $\mu$ value is completed. If it is judged that the front wheel speed is decelerated, it is judged in the Step 2 whether the speed difference between the front and the rear wheels is higher than the setting value. If it is judged that the speed difference between the front and the rear wheels is higher than the setting value, a counter value is increased by a predetermined value in the Step 3. If it is judged that the speed difference between the front and the rear wheels is not higher than the predetermined value, the counter value is decreased by a predetermined value in the Step 4.

Next, it is judged whether the counter value thus calculated in the Step 5 is higher than the predetermined value or not. If it is judged that the counter value is higher than the predetermined value, a high $\mu$ flag is set in the Step 6. If it is judged that the counter value is not higher than the predetermined value, the high $\mu$ flag is cleared in the Step 7. Thus, it is judged whether the road has high $\mu$ value or not by the speed difference between the front and the rear wheels and by the duration, during which the speed difference is maintained.

When the high $\mu$ flag is set after judging that the road has high $\mu$ value, a control value for high $\mu$ value, which has been preset as a control value for anti-skid brake control, is set. When the high $\mu$ flag has been cleared, a control value for low $\mu$ value, which has been preset for a control value of the antiskid brake control, is set.

Next, a description will be given on the case where a friction coefficient of road surface is judged based on the Judgment of a low $\mu$ value of road surface. This case is shown by the parenthetical expressions in FIG. 2.

The steps 1, 2 and 5 in FIG. 2 are the same as in the case where the friction coefficient of road surface is Judged based on the Judgment of a high $\mu$ value of road surface. Therefore, only a description of the different portions will be given, and no description for the same portions will be given.

When it is judged that the speed difference of the front and rear wheels is higher than a predetermined value in the step 2, the counter value is decreased by a predetermined decrement in the step 3. When it is Judged that speed difference of front and rear wheels is not higher than a predetermined 2, the counter value is increased by a predetermined increment in the step 4. When it is judged that the counter value is higher than the setting value in the step 5, the low $\mu$ flag is set. When it is Judged that the counter value is not higher than the setting value, the low $\mu$ flag is cleared.

The parameters to change the control value for anti-skid brake control to match $\mu$ value are: a filter value to determine upper and lower limits when the estimated car body speed is calculated, adjustment of duty ratio of pressure increase and decrease to match $\mu$ value, judgment of whether or not high $\mu$ duty ratio or low $\mu$ duty ratio in the initial pressure reduction in setting duty ratio of pressure increase and decrease to match $\mu$ value, a gradient of pressure increase and reduction of wheel cylinder, a threshold for starting pressure increase or decrease.

Thus, anti-skid brake control is set to a control pattern, which matches the $\mu$ value judged before anti-skid brake control is started after braking. In so doing, anti-skid brake control is performed on locked wheels when at least one of the front and the rear wheels is going to be locked after the $\mu$ value of road surface has been judged. In this case, control can be more adequately carried out by a control pattern, which matches the $\mu$ value of the road surface, judged before anti-skid brake control is started.

As it is evident from the above description, it is possible according to the method for judging a friction coefficient of road surface of this invention to judge the $\mu$ value of road surface reliably and easily before anti-skid brake control is started.

Because anti-skid brake control is performed on the basis of a friction coefficient of the road surface judged before anti-skid brake control is started, the anti-skid brake control can be more adequately carried out to match the friction coefficient of road surface.

What we claim is:

1. A method for adjusting braking pressure during anti-skid brake control in a vehicle, which comprises determining a friction coefficient of a road surface when front wheels of said vehicle are in a decelerating state increasing a counter value with a preset initial value by a predetermined increment when a speed difference between rear and said front wheels of said vehicle is higher than a first setting value, decreasing said counter value by a predetermined decrement when said speed difference between said rear and front wheels of said vehicle is lower than or equal to said first setting value, setting said friction coefficient as a high friction coefficient when the resultant counter value is higher than a second setting value, setting said friction coefficient as a low friction coefficient when the resultant counter value is lower than said second setting value, and adjusting pressure increase and decrease during said anti-skid brake control to match the set friction coefficient.

2. The method for adjusting braking pressure during anti-skid brake Control according to claim 1, wherein said friction coefficient is independently determined for left and fight wheels of said vehicle.

3. A method for adjusting braking pressure during antiskid brake control in a vehicle which comprises determining a friction coefficient of a road surface when front wheels of a vehicle are in a decelerating state, by decreasing a counter value with a present initial value by a predetermined decrement when a speed difference between rear and said front rear wheels of a vehicle is higher than a first setting value, increasing said counter value by a predetermined increment when said speed difference between said rear and front wheels of a vehicle is lower than said first setting value, setting said friction coefficient as a low friction coefficient when the resultant counter value is higher than a second setting value, setting said friction coefficient as a high friction coefficient when the resultant counter value is lower than said second setting value and adulating pressure increase and decrease during said anti-skid brake control to match the set friction coefficient.

4. The method for adjusting braking pressure during anti-skid brake control according to claim 3, wherein said friction coefficient is independently determined for left and right wheels of said vehicle.

5. A method for adjusting braking pressure during anti-skid brake control in a vehicle on a road which comprises:
  detecting when front wheels of said vehicle are in a decelerating state, and then
  increasing a counter value with a preset initial value by a predetermined increment when speed difference between rear and said front wheel of said vehicle is higher than a first setting value,
  decreasing said counter value by a predetermined decrement when said speed difference is less than said first setting value,
  setting a friction coefficient of said road as high when said counter value is higher than a second setting value,
  setting said friction coefficient as low when said counter value is not higher than said second setting value, and
  adjusting pressure increase and decrease during said anti-skid brake control to match the set friction coefficient.

6. The method for adjusting braking pressure during anti-skid brake control according to claim 5, wherein said friction coefficient is set independently for left and rear wheels of said vehicle.

* * * * *